United States Patent [19]

Drummond

[11] 4,337,073
[45] Jun. 29, 1982

[54] ROTARY FOREHEARTH

[75] Inventor: Warren W. Drummond, Allison Park, Pa.

[73] Assignee: PPG Industries, Inc., Pittsburgh, Pa.

[21] Appl. No.: 221,486

[22] Filed: Dec. 30, 1980

[51] Int. Cl.³ .......................................... C03B 37/025
[52] U.S. Cl. ............................................... 65/1; 65/2; 65/10.1; 65/346
[58] Field of Search ........................ 65/1, 2, 10.1, 346, 65/356

[56] References Cited

U.S. PATENT DOCUMENTS

| | | | |
|---|---|---|---|
| 2,460,547 | 2/1949 | Stevens | 49/55 |
| 3,265,477 | 8/1966 | McCoppin | 65/1 |
| 3,285,720 | 11/1966 | Drummond | 65/2 X |
| 4,203,746 | 5/1980 | Battigelli et al. | 65/6 |
| 4,203,747 | 5/1980 | Fezenko | 65/6 |

Primary Examiner—Robert L. Lindsay, Jr.
Attorney, Agent, or Firm—John E. Curley

[57] ABSTRACT

A rotary forehearth for use particularly in formation of glass fiber filaments through bushings is disclosed. A stator portion of the forehearth carries the bushings and a rotor portion of the forehearth receives molten glass from a suitable supply source, mixing the glass to homogenize it and distribute it at a uniform temperature, and disperses the uniform temperature molten glass to the bushings. The rotary forehearth is heated by suitable assemblies which maintain all portions of the forehearth at a uniform teperature. A uniform heating of the rotary forehearth and a uniform mixing and temperature of the molten glass is provided with a single controller. The bushings are uniformly heated and are supplied with molten glass at a nearly constant viscosity to facilitate the formation of glass fiber filaments having substantially less variation in diameter than heretofore possible.

23 Claims, 6 Drawing Figures

ROTARY FOREHEARTH

FIELD OF THE INVENTION

The present invention is directed generally to the establishment of uniform and constant glass and bushing conditions in the formation of glass fibers. More particularly, the invention is directed to a method and apparatus for improving the uniformity of molten glass delivered to glass fiber making bushings from a forehearth. Still more particularly, the present invention is directed to a rotary forehearth used to deliver molten glass from a glass making furnace to a glass fiber forming bushing at uniform temperature and with improved homogeneity.

DESCRIPTION OF THE PRIOR ART

It is well known generally in the art to form molten glass into filaments by passage of the glass through a bushing assembly. This continuous strand fiber forming process has not undergone any radical changes since its origins. While engineering and improved glass making have brought about a much improved manufacturing capability, the resistance heated, platinum bushing has remained intact as the fiber forming device which is almost universally used to form glass filaments.

Molten glass for use in the bushing is supplied by a forehearth which is an elongated open channel. Present forehearths in use for glass fiber filament formation range in length from 20 feet up to nearly 300 feet. Such elongated forehearths have numerous problems with expansion of materials, temperature control, uneven slopes, and the like which reduce the ability of the bushing to deliver a uniform glass product in a continuous manner.

In the formation of glass fibers, diameter variation in the fibers being produced by a given bushing is apt to be in the range of 2 to 1. This is a four to one or 400 percent variation in mass and obviously is not desirable. Bushings are made with all the tips or nozzles having the same size. Thus, the primary reason for filament size variations is generally attributed to variations in the viscosity of the glass above the tips, in the tips, and below the tips. Since glass viscosity is a direct function of glass temperature, it will be seen that non-uniformity of glass temperature in the bushing, and through the tip plate will cause glass viscosity differences and hence glass filament diameter variations.

In most glass fiber filament forming devices, the bushing tip plate is electrically heated. A suitable sensing means is secured to the tip plate to monitor the temperature of the tip plate and a feedback control assembly is provided to adjust the current flow thereto. This feedback control system is provided for each bushing which is used to adjust the current flow that modulates the heating of the bushing tip plate. A thermocouple attachment to the bushing provides the sensing means for control. It can only measure the temperatures at the point of attachment and the control system keeps that point constant in temperature. Other portions of the tip plate, however, may vary in temperature due to a different glass channelling or other heating anomalies so that the filaments being attenuated from the bushing will not be of the desired diameter because the viscosity of the molten glass will be either too high or low. If the glass could be supplied to the bushing at a uniform, desired temperature and if the tip plate of the bushing could be always maintained at this desired temperature, the diameter variations in the filaments being formed by the bushing could be largely eliminated.

The molten glass in the forehearth is usually provided by a glass melting furnace positioned at one end of the forehearth. Since the conventional forehearth is an elongated channel, the temperature of the glass in the forehearth is apt to decrease as the glass flows further away from the furnace. This tendency of the glass to cool is counteracted by the use of heating means of various types along the length of the forehearth. The amount of heating which must be applied will increase as the distance from the furnace increases. Again, various controls and monitoring means are utilized, but it is difficult to provide a given temperature along the entire length of the forehearth. It is even more difficult to impart such a uniform temperature, assuming it can be maintained in the forehearth, to the glass flowing in the forehearth channel. Further, even though the glass is molten and flowable, in a forehearth it does not readily mix as it flows to the bushing because of its viscous properties.

Since the molten glass is not easily mixed it tends to form temperature striations in the forehearth. The result of this is that glass viscosity varies considerably entering bushings from the forehearth and combined with variations in heating bushing tip plates causes non-uniform viscosities at the point of fiber formation.

Although a great deal of effort has been made to improve presently practiced glass fiber forming procedures, the inherent drawbacks remain. The conventional elongated forehearth, resistance heated bushing concept of producing glass fiber filaments is vastly more sophisticated today than at its inception but its underlying drawbacks and problems have not been eliminated.

SUMMARY OF THE INVENTION

It is an object of the present invention to provide a method and apparatus for forming continuous glass fibers having controlled and constant fiber diameters.

It is another object of the invention to conserve energy expended in glass fiber forming.

Another object of the present invention is to provide a means for keeping glass viscosity constant after melting to prevent large variations at the fiber forming bushing.

A further object of the invention is to improve the quality and uniformity of molten glass in a forehearth by providing good mixing.

A further object of the invention is to provide clean glass by reducing refractory contamination in forehearth and thereby improve glass fiber production.

A further object of the invention is to reduce the use of precious metal in the construction of glass fiber forming bushings.

A further object is to reduce the cost of controls required to achieve good quality glass fibers from a bushing.

Another object of the present invention is to provide a rotary forehearth having stationary bushings.

A still further object of the present invention is to provide a rotary forehearth having rotary glass distribution means.

Yet another object of the present invention is to provide a rotary forehearth wherein the glass is thoroughly mixed.

Still a further object of the present invention is to provide a rotary forehearth wherein the molten glass is maintained at a uniform temperature.

An additional object of the present invention is to provide a rotary forehearth wherein the glass fiber filament forming bushings are not electrically heated.

As will be set forth in greater detail in the description of preferred embodiments, the rotary forehearth used in accordance with the present invention, is comprised generally of a fixed, annular or disk-shaped stator and a cooperatively shaped rotor. The stator is provided with a plurality of bushings about its periphery, each of these bushings having a perforated tip plate through which the molten glass passes. In this respect, the bushings are similar to known devices. The rotor moves in a circular path and receives molten glass from a conventional source such as a furnace. The molten glass is supplied to the rotor at one or more positions. This molten glass is thoroughly mixed in the rotor and is delivered to the bushings which are carried by the stator. In one embodiment, the bushings all receive molten glass from a single circular channel in the stator. In a second embodiment, the bushings all receive molten glass directly from a circular channel in the rotor. In the several embodiments the rotary forehearth is maintained at a uniform temperature and the molten glass is uniformly mixed to also maintain a uniform glass temperature. Since the rotary forehearth, bushings, and glass are all maintained at a uniform temperature, the glass fiber filaments formed by the rotary forehearth have a much more uniform diameter than those produced by present devices.

Instead of attempting to modify the existing elongated forehearth and serially arranged bushings of the prior art, the rotary forehearth of the present invention departs quite radically from the known concepts and uses new concepts to produce glass fiber filaments. Thus, the glass supplied from the melting furnace is fed to the rotor in a plurality of streams. Any temperature differences which may exist in these streams are eliminated since each section of the rotor passes each incoming stream of molten glass. Thus, the glass from the furnace is broken up into a number of smaller streams, each of which is then evenly distributed to the entire rotor. These streams are reformed in the rotor, streamed into smaller streams for recombination in the stator. This mixing can be analogized to a calculus technique wherein the glass stream is broken up or differentiated and is then recombined or integrated. Since the glass tends to remain in various cohesive globs, this breaking up and re-combining is a very effective way of obtaining uniform glass temperature in the rotary forehearth.

The rotary forehearth is provided with suitable heating means spaced about the device. These heating means may be electric resistance elements, conduits which receive hot gas, or may be other generally known means for supplying heat. Since the rotor moves past all of the spaced heating means, each section of the rotor is equally affected by all the heating means. Variations in the temperature produced by each heating means will not cause a corresponding hot area on the rotor since each portion of the rotor is equally heated as it passes each heating means. In turn, since each section of the rotor passes each portion of the stator, all of the bushings are equally heated. The rotor and stator are structured primarily of high density refractory material which is not readily affected by transient temperature changes. In this respect, the rotary forehearth can be viewed as a thermal flywheel. When the mass of the flywheel is sufficiently large, its thermal inertia is difficult to overcome. Thus, once the rotary forehearth has been heated to its operating temperature, it will tend to remain at that temperature.

In contrast to the conventional elongated forehearth, the rotary forehearth of the present invention has no beginning or end. Since both the rotor and stator are generally annluar or disk-shaped, they are symmetrical about a central point. There is no temperature differential along the rotary forehearth as there is in the elongated forehearth. All of the portions of the rotor, the stator, and the bushings, are equally spaced from the heating means.

The cross-section of the rotor and stator channels can be maintained narrow and shallow because little lateral flow of glass takes place. Glass flow in this process may be characterized as subsidence flow rather than horizontal flow. Refractory contact is therefore minimized and precious metal lining of the channels can be justified. By reducing refractory contact, the quality of glass is greatly improved by the elimination of refractory inclusions in the glass which causes filament breakage in the fiber forming process.

It should also be noted that since the bushing can be operated without electric connections that substantial savings of platinum metal can be realized and bushing power equipment eliminated.

Since the entire rotary forehearth of the present invention is kept at a uniform temperature and since the molten glass fed thereto is thoroughly mixed and also maintained at a uniform temperature, the viscosity of the molten glass which is delivered to all the bushings is the same and the filaments produced by the several bushings are substantially uniform in diameter. This uniformity in diameter facilitates more efficient production, higher quality filaments and greater output. The rotary forehearth of the present invention provides a new and unique approach to the formation of glass fiber filaments, an approach which eliminated many of the problems inherent in the prior art devices.

BRIEF DESCRIPTION OF THE DRAWINGS

While the novel features of the rotary forehearth, in accordance with the present invention, are set forth with particularity in the appended claims, a full and complete understanding of the invention will be had by referring to the description of preferred embodiments as set forth hereinafter and as may be seen in the accompanying drawings in which:

DESCRIPTION OF THE PREFERRED EMBODIMENTS

Figure 1:
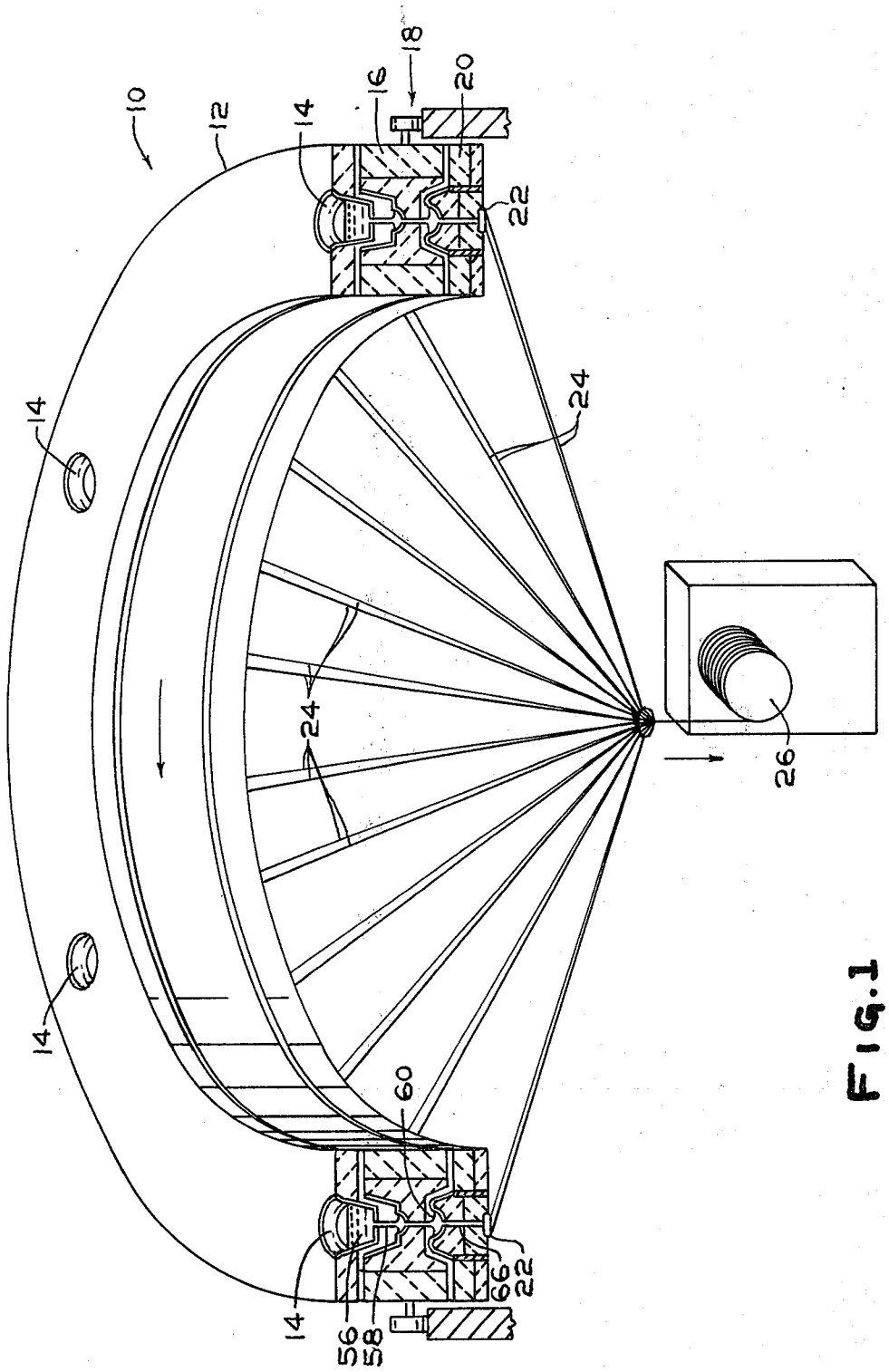
FIG. 1 is a perspective view of a schematic representation of a portion of a rotary forehearth, in accordance with the present invention.

Turning initially to FIG. 1, there may be seen a schematic representation of a portion of a glass fiber filament forming assembly using a rotary forehearth, generally at 10, in accordance with the present invention. It will be understood that the rotary forehearth 10 shown in FIG. 1 is intended to provide primarily an understanding of the concept and operation of the present invention rather than a complete disclosure of a preferred embodiment, such disclosures of preferred embodiments being set forth in conjunction with FIGS. 2-6.

As may be seen in FIG. 1, rotary forehearth 10 has a fixed cover 12 having molten glass receiving ports 14. Molten glass is delivered through the ports 14 to a rotor 16 which has suitable drive means 18. Rotor 16, in turn, delivers the molten glass to a stator 20 that carries a plurality of glass fiber filament forming bushings 22. Each of these bushings supplies filaments 24 which are collected on a suitable package 26 driven by a known winder assembly 28. The molten glass is delivered to the several glass ports 14 from a common source, now shown. Although the molten glass should be at a uniform temperature, any variations will be compensated for since the glass from each port 14 is deposited about the whole rotor 16 as it rotates beneath the ports 14. This molten glass passes through the rotor and is again broken down into a number of separate streams. These streams from all the sections of the rotor are mixed in the stator 20 with each section of the stator receiving some glass from all portions of the rotor 16. The bushings 22, thus, all receive molten glass which has been thoroughly mixed and is at a uniform temperature. This molten glass is formed into glass fiber filaments 24 all having a uniform diameter, which filaments 24 are attenuated and wound into package 26. Although no specific heating means is shown in FIG. 1 for sake of simplicity, it will be understood that heating means are provided. All sections of the rotor 16 pass by each heating means, and the rotary forehearth 10 will be maintained at a uniform temperature throughout.

Figure 2:
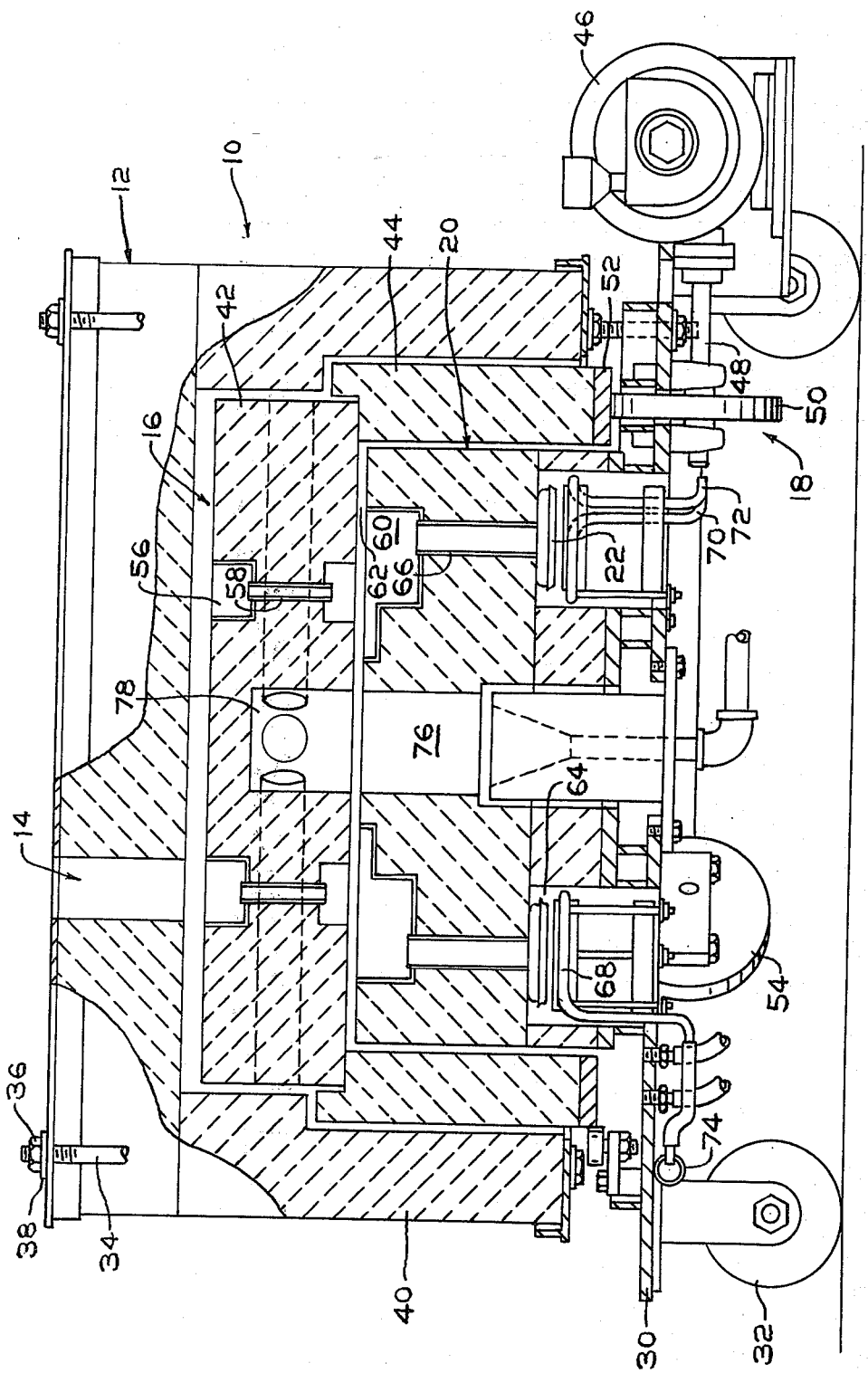
FIG. 2 is a side elevational view, partly in section, of a first preferred embodiment of a rotary forehearth, in accordance with the present invention.
Figure 3:
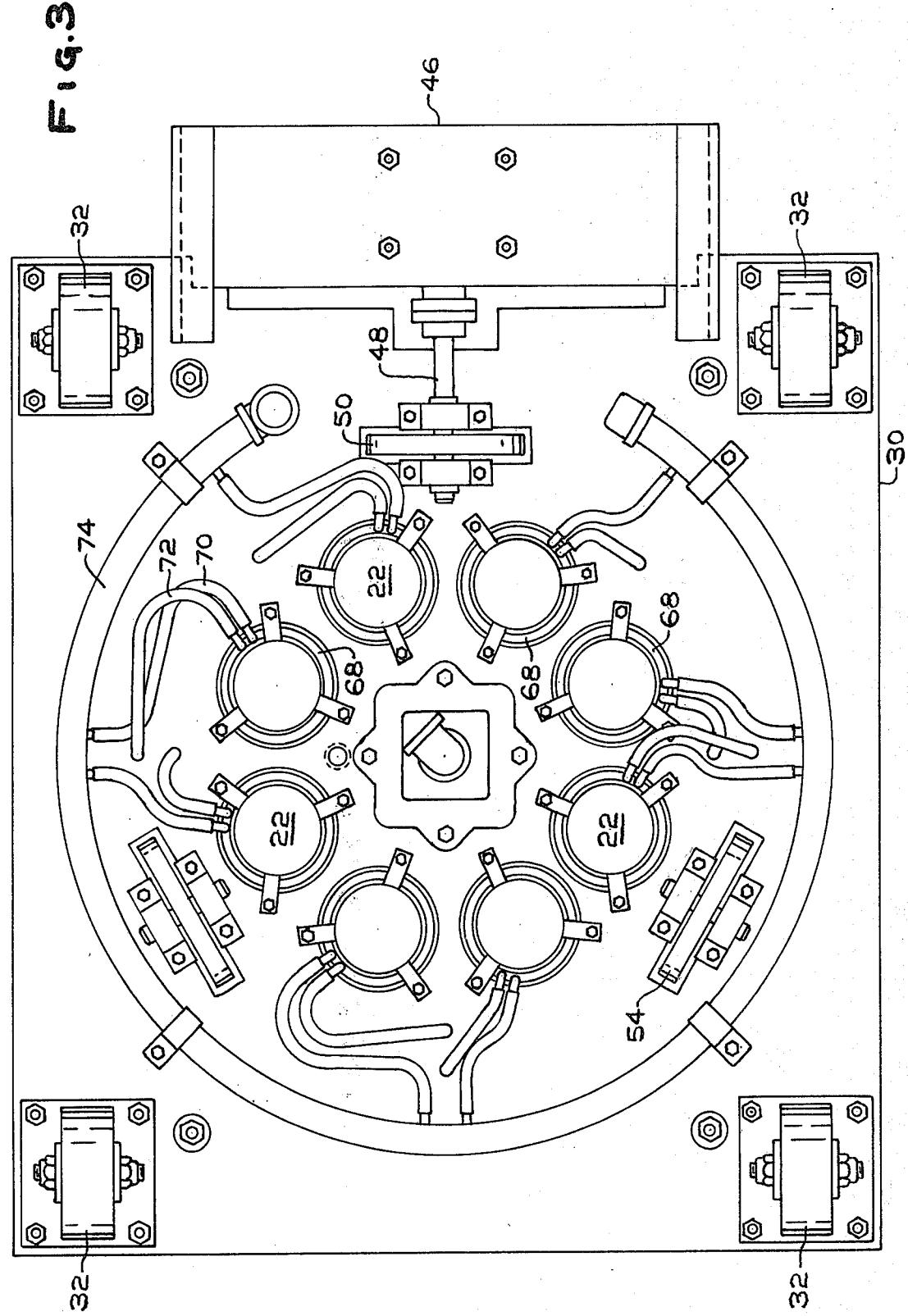
FIG. 3 is a bottom plan view of the rotary forehearth of FIG. 2.

Referring now to FIGS. 2 and 3, there may be seen a first preferred embodiment of the rotary forehearth 10, in accordance with the present invention. Since the several preferred embodiments all have generally the components set forth in FIG. 1, those numerals used in FIG. 1 will be used to identify corresponding elements in the various other figures. Rotary forehearth 10, as seen in FIG. 2, is structured primarily of castable refractory material and has sufficient mass as to not be readily affected by external temperature fluctuations. The rotary forehearth 10 is generally cylindrical in shape and is supported on a platform 30 which is provided with suitable support wheels 32. Cover 12 is held in place by a plurality of threaded rods 34 and cooperating nuts 36 and washers 38, these rods passing downwardly into the insulated side 40 of the rotary forehearth. A plurality of molten glass ports 14 are provided in cover 12 with only one being shown in FIG. 2.

Rotor 16, in the first preferred embodiment, is shaped generally as an inverted cup and has a disk-shaped top 42 and downwardly extending sides 44. Drive means 18 includes a motor 46 which turns a drive shaft 48 that carries a drive wheel 50 which is in contact with the lower portion 52 of side wall 44 of the rotor 16. Spaced idler wheels 54 support rotor wall 44 at spaced points.

Rotor top 42 is provided with an annular trough 56 into which molten glass flows from port 14. This trough has a plurality of discharge conduits 58 which extend downwardly through the rotor top and terminate above a glass receiving channel 60 formed in the upper surface 62 of stator 20. Stator 20 is generally annular shaped and is enclosed within the inverted cup shaped rotor 16. Each of the several bushings 22 which are positioned on the lower surface 64 of stator 20 is in communication with glass receiving channel 60 through a molten glass delivery pipe 66. Each bushing 22 has a filament coolant ring 68 adjacent the tip plate and each such ring is supplied with coolant liquid through suitable lines 70 and 72 connected to a header 74.

The rotary forehearth as shown in FIGS. 2 and 3 is heated by flow of hot gas upwardly through a central aperture 76 in the stator 20 and outwardly through radially extending gas passageways 78 in rotor 16. As seen by the dashed lines in FIG. 2, these radial gas passageways 78 extend outwardly through rotor 16 so that the flow of hot gas can circulate within the spaces between the rotor 16, the stator 20, and the cover 12.

In operation of the first preferred embodiment of the rotary forehearth as shown in FIGS. 2 and 3, drive motor 46 causes rotation of drive wheel 50 which, in turn, causes rotor 16 to rotate about the fixed stator 20. Molten glass is fed into the glass receiving ports 14 in the stationary cover 12 and is received in annular trough 56 in the rotor. This glass flow is evenly distributed in trough 56 since all portions of the trough pass by each glass port 14. The glass in trough 56 then flows downwardly through discharge conduits 56 in rotor 16 into the glass receiving channel 60 in the stator. Again, since each portion of channel 60 receives glass from all of the discharge conduit 58 in the rotor, the molten glass is thoroughly mixed and is at a uniform temperature when it is delivered to channel 60. This molten glass flows through the glass conducting pipes 66 to the various bushings 22 and is attenuated into filaments by conventional means such as the winder 28 shown in FIG. 1.

The entire assembly is uniformly heated by the hot gas passing through the stator 20 and rotor 16. Because the radially extending gas passages 78 in the rotor 16 are always moving, the heated gas is distributed evenly to the entire assembly and no hot or cold spots are created. By uniformly mixing the molten glass prior to its delivery to bushings 22 and by insuring that the entire assembly is uniformly heated, the glass filaments which are produced will be much more uniform in diameter than those presently produced.

Figure 4:
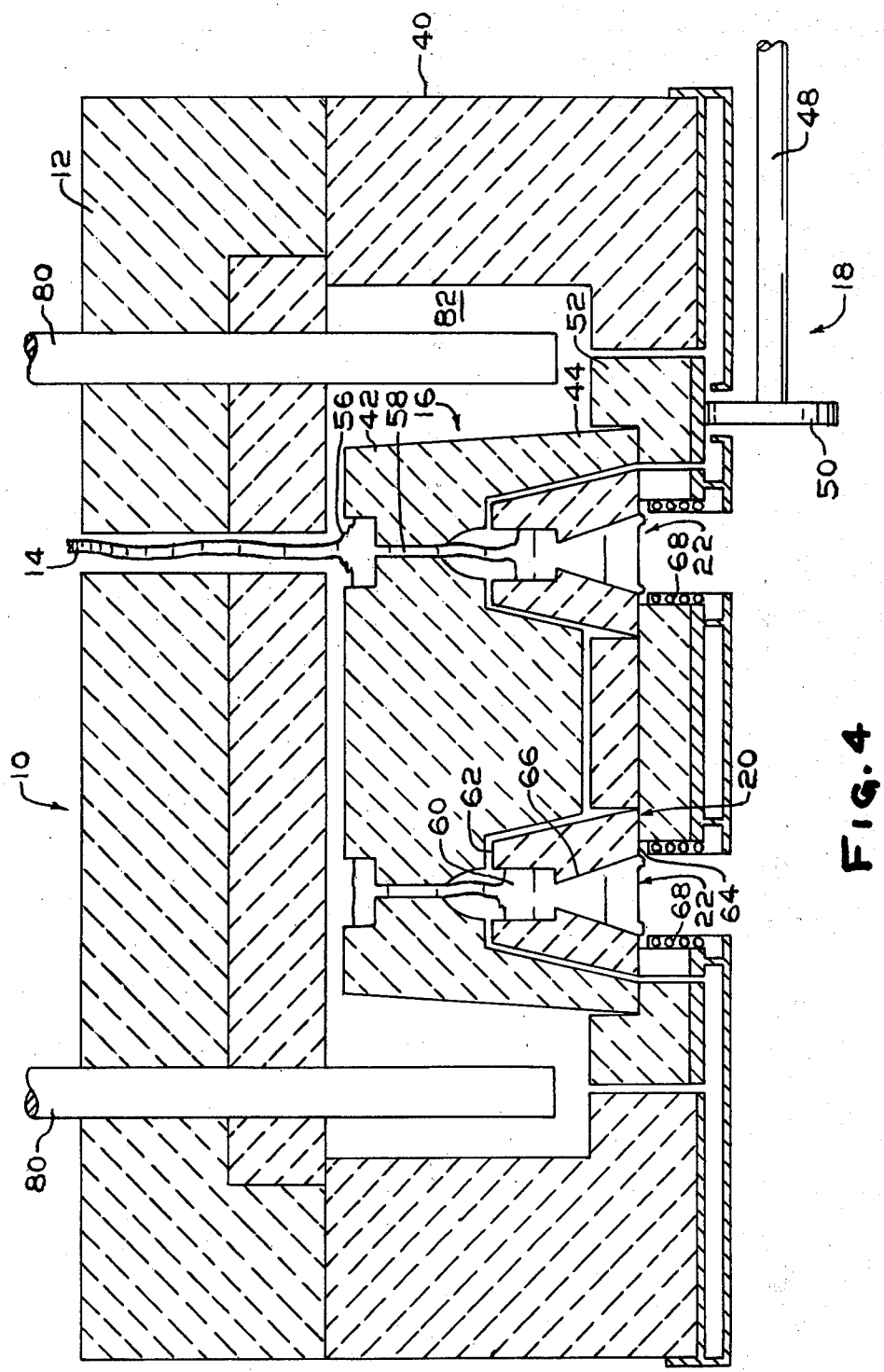
FIG. 4 is a sectional side elevation view of a second preferred embodiment of a rotary forehearth, in accordance with the present invention.

Turning now to FIG. 4, there may be seen a second preferred embodiment of a rotary forehearth, in accordance with the present invention. This second preferred embodiment is generally the same as the first preferred embodiment discussed hereinabove, and as set forth in FIGS. 2 and 3 with the primary difference being in the type of heating means utilized. Accordingly, similar numerals have been applied to corresponding elements in both embodiments. As may be seen in FIG. 4, molten glass is supplied to one or more spaced glass receiving ports 14 provided in cover 12. The glass flows into an annular trough 56 in the upper surface of rotor 16. Rotor 16 is provided with downwardly extending sides 44 with a drive wheel 50 engaging the lower portion 52 of the downwardly extending rotor side 44. Molten glass passes through discharge conduit 58 in rotor 16 and into a glass receiving channel 60 in stator 20. From there the glass flows down glass delivery pipe 66 to bushings 22 where it is formed into filaments and attenuated. The mixing action of the glass, as described in the first preferred embodiment, takes place in the same manner in this second preferred embodiment.

This second preferred embodiment differs from the first primarily in the means for supplying heat to the rotary forehearth. While the first embodiment utilized the flow of hot gases through radially extending arms in the rotor to evenly heat the assembly, the second preferred embodiment uses a plurality of spaced stationary electric resistance heating elements 80. These heating elements 80, which are known commercially as Globar elements, extend downwardly through cover 12 and into an annular space 82 formed between the outer surface of the rotor 16 and the inner surface of the side wall 40 of the unit. Each of these heating elements 80 is controlled as closely as possible to maintain all of the elements at the same temperature. However, absolute uniformity of these heating elements is not essential since each section of the rotor 16 passes each of the heating elements 80. Thus, a higher or lower temperature than desired being generated by one of the heaters 80 will effect the entire rotor uniformly. The result is that the rotor is uniformly heated. Since the rotor is uniformly heated and since each section of the rotor passes around the entire stator, the stator will also be heated uniformly and kept at one temperature throughout. With the rotor and stator being uniformly heated and with the glass being uniformly mixed and kept at a uniform temperature throughout the stator and all of the bushings which in turn, do not need any additional heating means, the filaments formed have a uniform diameter.

Figure 6:
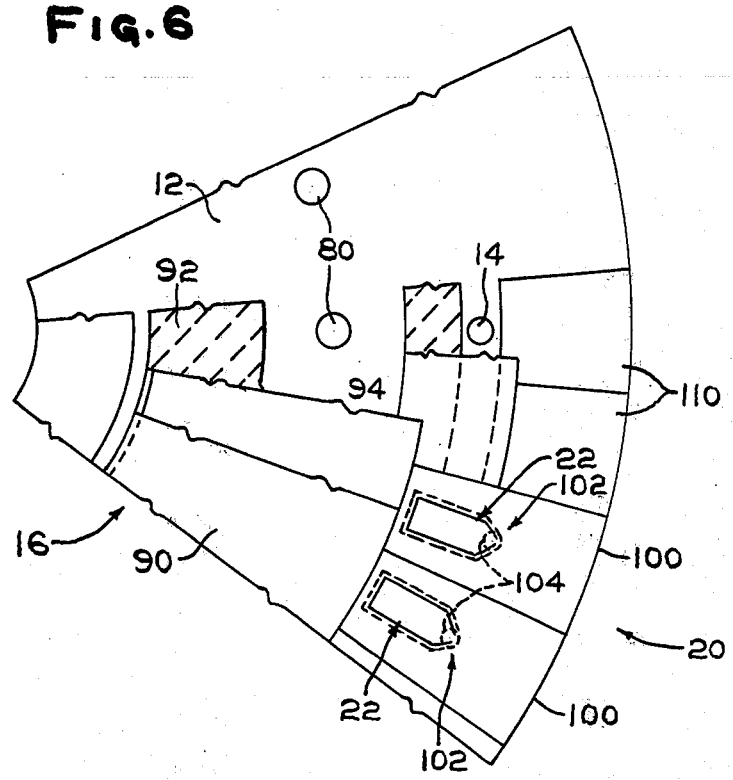
FIG. 6 is a partial sectional top view of the third preferred embodiment of a rotary forehearth.
Figure 5:
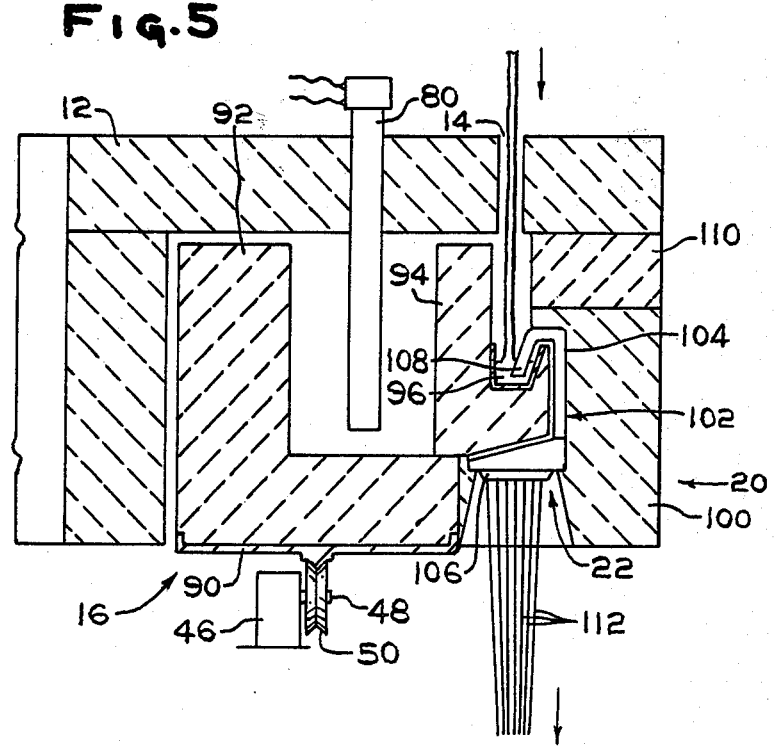
FIG. 5 is a partial sectional side elevation view of a third preferred embodiment of a rotary forehearth, in accordance with the present invention.

Referring now to FIGS. 5 and 6, there is shown a third preferred embodiment of a rotary forehearth in accordance with the present invention. While this rotary forehearth is somewhat different in structure from the first and second preferred embodiments described hereinabove, its operative concepts are the same. Similar numerals will be utilized where appropriate to indicate corresponding elements of the device. It should be noted that FIG. 5 is a sectional view of only one-half of the rotary forehearth, this half being the right half. A stationary cover 12 has one or more glass receiving ports 14 through which molten glass flows. Cover 12 also carries a plurality of electrical resistance heating elements 80 of the Globar type, as discussed in the second preferred embodiment. A drive wheel 50 is driven by a motor 46 through a shaft 48 to effect rotation of the rotor portion 16 of the rotary forehearth.

As may be seen in FIG. 5, the rotor 16 is generally U-shaped in cross section with a bottom portion 90 and upstanding inner and outer wall sections 92 and 94, respectively. The electric resistance heating elements 80 extend downwardly through fixed cover 12 into the interior space of the U-shaped rotor 16. The outer wall 94 of rotor 16 has a glass receiving trough 96 formed in its periphery. This glass trough receives the molten glass coming in through the glass ports 14 in the fixed cover 12. Since rotor 16 and hence glass trough 96 are constantly in rotation, the molten glass entering trough 96 from the several sources is well mixed and is maintained at an even and uniform temperature.

Stator 20 includes, as may be seen in FIG. 5, a bushing insulation block 100 to which is secured a syphon bushing, generally at 102. This bushing is known in the art and is set forth in applicant's prior U.S. Pat. No. 3,285,720. Syphon bushing 102 includes a glass flow tube 104 which extends into the molten glass in glass trough 96 and through which the molten glass flows to the tip plate portion 106 of the syphon bushing 102. A first end 108 of glass flow tube 104 extends into the molten glass in trough 96, receiving glass as the trough 96 moves past the tube 104. Hence, the bushing receives glass from the entire trough to again insure uniformity of glass temperature.

A removable insulative block segment 110 is carried above bushing insulation block 100. If it is necessary to service or replace a particular bushing, this can be easily accomplished by removing block 110 and by then removing bushing insulation block 100 and bushing 102 which is attached thereto. As may be seen in FIG. 6, each bushing block 100 is a trunchated pre-shaped element and the various bushing blocks 100 cooperate to form the outer portion of the stator 20. Each syphon bushing 102 produces its array of filaments 112 which are then suitably wound or otherwise packaged.

In operation, the third preferred embodiment of the rotary forehearth, in accordance with the present invention, is heated to a uniform temperature by the spaced heating units 80 which extend through the fixed cover 12 into the space in the rotor 16. Since each section of the rotor 16 passes each of the heating elements 80, the entire rotor is uniformly heated. This evenly heated rotor 16 in turn evenly heats every portion of the stator 20 and the bushings 22 carried thereby. The molten glass which will be formed into glass fiber filaments by bushing 22, passes through a plurality of glass ports 14 in cover 12 from a single source such as a furnace not shown. These streams of glass are received in the moving trough 96 of the rotor 16 where the glass streams are re-combined into a body of glass of uniform temperature. This glass is then picked up by the various syphon bushings 102 and is formed into filaments. As in the prior two embodiments described above, the apparatus is structured and operated to insure that all areas of the apparatus and all portions of the glass being formed into filaments will be kept at a uniform temperature. If the glass is all at a uniform temperature, its viscosity will be uniform and the filaments produced by the various bushings will be much more uniform in diameter than those which are presently being formed.

In the preceding description of preferred embodiments of a rotary forehearth, in accordance with the present invention, the specific materials utilized in the construction of the units have not been extensively discussed. The materials used are generally conventional and known to those skilled in the art. The rotors and stators are made primarily of castable refractory materials which will not be adversely affected by contact with molten glass. The various drive wheels, bearings, supports, and the like, which are needed to afford movement of the rotor are also known in the art. Any passages through which molten glass flows such as the troughs, conduits, pipes, and the like, in the rotors and stators are all lined with a noble metal or metal alloy such as platinum or platinum-rhodium. Likewise, the bushings and their various conduits are structured of known materials preferably platinum-rhodium alloy. The rotary forehearth of the present invention is characterized by its ability to provide a uniform temperature throughout the assembly and a uniform glass temperature throughout the forehearth. Since it is able to do this, the glass fiber filaments which are produced have significantly less size deviation than prior devices. The thrust of the invention resides in the concept and cooperation of the various parts of the device and not in the specific materials used in their manufacture.

While preferred embodiments of a rotary forehearth, in accordance with the present invention have been hereinabove fully and completely described, it will be obvious to one of skill in the art that a number of changes in, for example, the specific materials used, the specific drive means, the size of the bushing tips, the specific heating means, and the like, could be made without departing from the true spirit and scope of the present invention and that the invention is to be limited only by the following claims.

I claim:

1. A rotary forehearth for producing glass fiber filaments from molten glass supplied to said rotary forehearth from a supply of said molten glass, said rotary forehearth comprising:
   a rotor, said rotor receiving said molten glass from said supply;
   a stator, said rotor being rotatable with respect to said stator;
   bushing means on said stator;
   means to supply said molten glass from said rotor to said bushing means;
   means to cause rotation of said rotor with respect to said stator; and
   means to heat said rotary forehearth.

2. The rotary forehearth of claim 1 wherein said rotor is generally disk-shaped.

3. The rotary forehearth of claim 1 including means to deliver molten glass from said supply to said rotor in a plurality of streams.

4. The rotary forehearth of claim 3 wherein said rotor includes an annular glass receiving trough.

5. The rotary forehearth of claim 1 further including a fixed cover.

6. The rotary forehearth of claim 5 wherein said fixed cover includes at least one glass receiving port.

7. The rotary forehearth of claim 6 wherein said molten glass passes through said glass port to said rotor.

8. The rotary forehearth of claim 7 wherein said rotor includes an annular glass receiving trough.

9. The rotary forehearth of claim 8 including means to deliver a plurality of streams from said annular trough to said stator.

10. The rotary forehearth of claim 1 wherein said stator is adjacent said rotor.

11. The rotary forehearth of claim 10 wherein means are provided to deliver molten glass from said rotor to said stator.

12. The rotary forehearth of claim 10 including means to deliver molten glass from said rotor to said bushing.

13. The rotary forehearth of claim 10 including means to deliver molten glass from said stator to said bushing.

14. The rotary forehearth of claim 13 wherein said stator includes a glass receiving channel.

15. The rotary forehearth of claim 14 including means to deliver molten glass from said glass receiving channel to said bushing.

16. The rotary forehearth of claim 12 wherein said bushing is a syphon bushing.

17. The rotary forehearth of claim 16 wherein said syphon bushing includes a glass flow tube, a first end of said glass flow tube receiving said molten glass from said rotor.

18. The rotary forehearth of claim 1 wherein said means to heat said rotary forehearth is a plurality of hot gas flow passageways in said rotor and stator.

19. The rotary forehearth of claim 1 wherein said means to heat said rotary forehearth is a plurality of spaced electric resistance heating elements.

20. The rotary forehearth of claim 19 wherein said heating elements extend through a cover portion of said rotary forehearth into a space adjacent said rotor.

21. The rotary forehearth of claim 1 wherein said drive means includes a drive motor and drive wheel, said drive wheel contacting said rotor to impart rotation thereto.

22. A process of forming glass fiber filaments in a rotary forehearth from molten glass including the steps of:
   feeding said molten glass to a rotor of said rotary forehearth through a plurality of glass ports in a cover of said rotary forehearth;
   transferring said molten glass from said rotor to a bushing carried in a stator of said rotary forehearth;
   maintaining said rotary forehearth at a desired temperature; and
   rotating said rotor with respect to said stator whereby said molten glass received in said rotor is evenly distributed to said bushings for formation into said filaments.

23. A process of forming glass fiber filaments comprising passing a molten glass stream into a plurality of streams of small cross-sectional area in a rotating channel, feeding small streams of molten glass from said rotating channel to a second channel continuously, feeding molten glass from said second channel to a glass fiber forming bushing continuously while maintaining the temperatures of the channels and glass contained therein constant.

* * * * *